G. M. EATON.
RESILIENT WHEEL.
APPLICATION FILED SEPT. 8, 1908.

917,855.

Patented Apr. 13, 1909.
3 SHEETS—SHEET 2.

WITNESSES:
C. L. Belcher
Otto S. Schairer

INVENTOR
George M. Eaton
BY
Wesley G. Carr
ATTORNEY

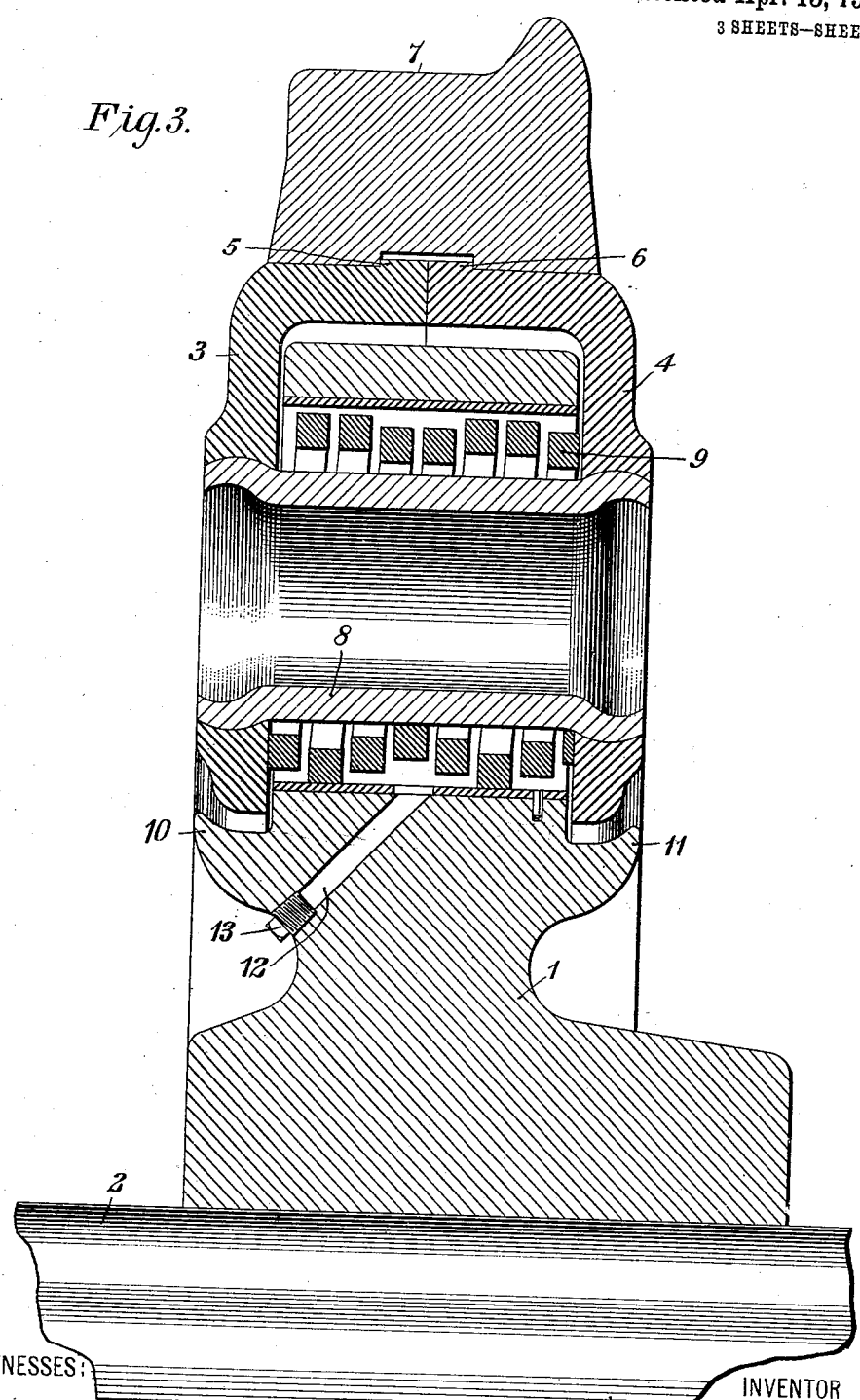

UNITED STATES PATENT OFFICE.

GEORGE M. EATON, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

RESILIENT WHEEL.

No. 917,855.  Specification of Letters Patent.  Patented April 13, 1909.

Application filed September 8, 1908. Serial No. 452,094.

*To all whom it may concern:*

Be it known that I, GEORGE M. EATON, a citizen of the United States, and a resident of Wilkinsburg, in the county of Allegheny and State of Pennsylvania, have invented a new and useful Improvement in Resilient Wheels, of which the following is a specification.

My invention relates to resilient wheels, and it has for its object to provide a resilient wheel of exceptionally strong, simple and economical construction in which the necessity of employing bolts, nuts or screws for securing its parts together is avoided.

Figure 1:
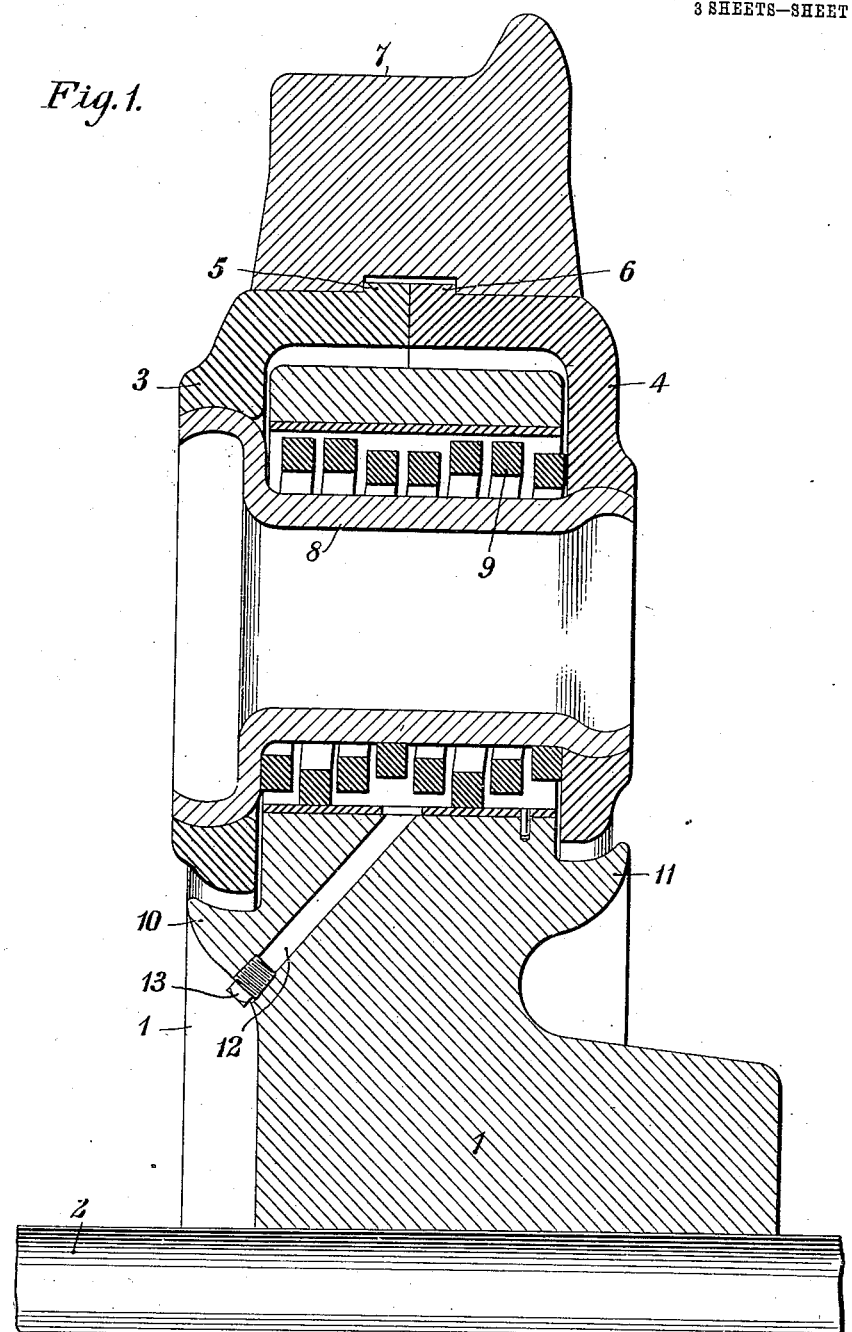
Figure 2:
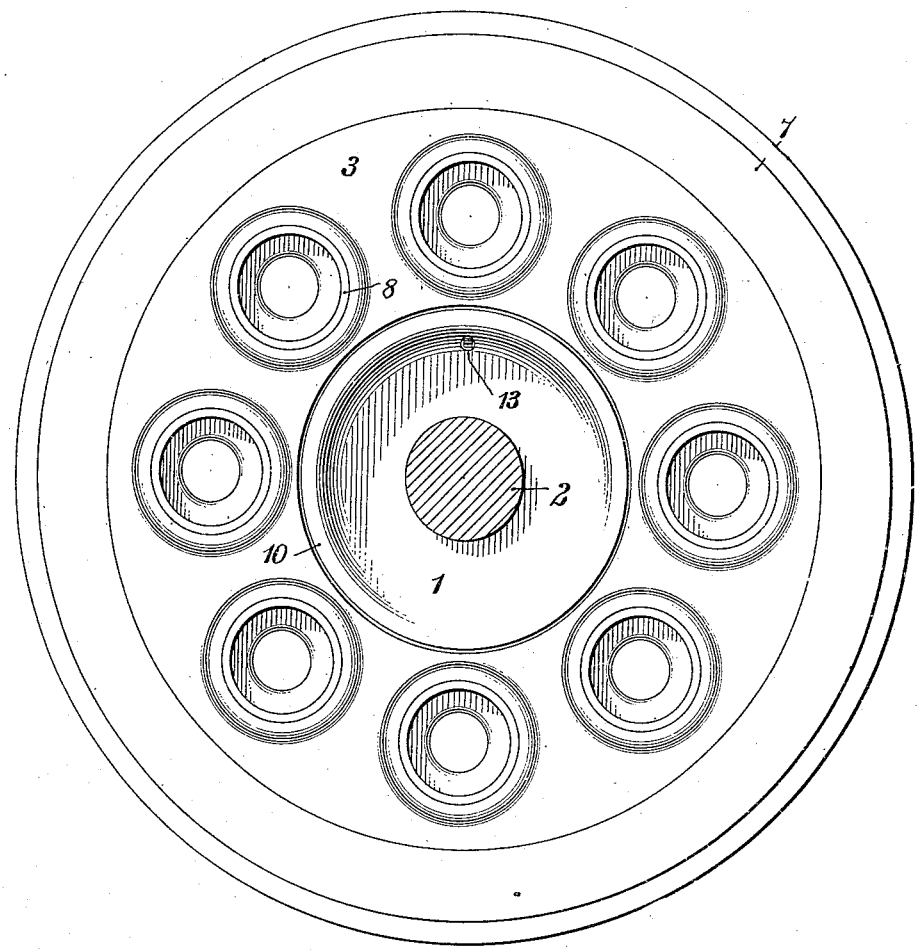

Figure 1 of the accompanying drawings is a transverse sectional view through a portion of a wheel constructed in accordance with the present invention. Fig. 2 is a view in side elevation of the wheel of Fig. 1, and Fig. 3 is a transverse sectional view through a portion of a wheel embodying a modification of the structure of Fig. 1.

The wheel comprises a spider 1 that is mounted upon an axle 2 and is provided with annularly arranged set of apertures near its outer edge. Disposed upon opposite sides of the spider and having their outer portions turned inwardly toward each other to form a cylindrical surface, are two annular plates 3 and 4 also having annularly arranged sets of apertures corresponding to and in alinement with the apertures in the spider 1, the apertures in the plate 3 being preferably of larger diameter than those in the plate 4 and of approximately the same diameter as the apertures in the spider as shown in Fig. 1, though the holes in both plates may be of the same diameter, if desired, as shown in Fig. 3. The plates 3 and 4 are provided upon their outer cylindrical surfaces adjacent to their abutting edges with flanges 5 and 6 that are adapted to occupy a recess in the inner circumferential surface of a rim 7 which is mounted upon the said cylindrical surface, the rim being applied in a heated condition and shrunk into position over the flanges. The rim, therefore, serves to secure the members 3 and 4 together and is itself secured in position upon the members. The plates 3 and 4 are also secured together by means of a set of sleeves 8 that extend through the alined apertures in the members 1, 3, and 4 and the ends of which are expanded into the apertures in the plates 3 and 4, the edges of which apertures are provided with concave seats for the reception thereof. Surrounding the sleeves 8 within the apertures in the spider 1 are helical springs 9, adjacent convolutions of which are eccentrically disposed, the said springs being constructed as set forth in Patent No. 817,133, granted April 3, 1906, to the Westinghouse Electric & Manufacturing Company, as assignee of Robert Siegfried.

In order to prevent the creeping of oil and water containing grit and other foreign substances from the axle and spider into the chambers containing the springs and upon the wearing surfaces, the spider is provided upon its opposite faces with flanges 10 and 11 from the edges of which the oil and water are thrown by centrifugal force. The chambers containing the springs will ordinarily be filled with a lubricant, to permit the insertion of which ducts 12 are provided in the spider leading from the exterior to the chambers, screw plugs 13 being provided for the outer ends of the ducts.

In order to assemble the wheel, the springs 9 are first inserted in the chambers in the spider and the members 3 and 4 next applied to the sides of the spider. The rim 7 is then applied to the cylindrical portions of the members 3 and 4 in a heated condition and shrunk into position. The sleeves 8 are finally inserted into the apertures in the spider 1 and in the members 3 and 4 and their ends expanded into the concave seats in the members 3 and 4.

With the structure of Fig. 1, the springs may be removed and replaced at any time by simply cutting away and removing the sleeves 8 and without removing the rim 7, since the apertures in the member 3 are of larger diameter than the springs. Of course, in assembling, the springs may also be inserted after the rim has been shrunk into position. If it is not desired, however, to thus construct the wheel to permit of ready repairing, it may be somewhat simplified and rendered more economical to manufacture by employing the structure of Fig. 3.

Thus it is seen that the present invention provides a wheel comprising a very small number of parts that are rigidly secured together in their proper relations without the employment of bolts, nuts, screws or other screw-threaded and similar fastening devices, and that the structure is exceptionally strong, as well as economical to manufacture. Because but few of the parts are subjected to wear, and because of the provision of large surfaces for wear between the spider 1 and the members 3 and 4, the wheel is also very durable.

I claim as my invention:

1. A resilient wheel comprising a spider having a set of apertures, members disposed upon opposite sides of the spider and having apertures corresponding to the apertures in the spider, a rim mounted upon the said members and securing the same together, sleeves extending through the corresponding apertures and secured at their ends to the said members, and resilient means surrounding the sleeves within the apertures in the spider.

2. A resilient wheel comprising a spider having a set of apertures, members disposed upon opposite sides of the spider and having apertures corresponding to the apertures in the spider, the apertures in one member being larger than those in the other, a rim mounted upon said members and securing the same together, sleeves extending through the corresponding apertures and secured at their ends in the apertures in the said members, and resilient means surrounding the sleeves within the apertures in the spider.

3. A resilient wheel comprising a spider having a set of apertures, members having cylindrical and annular portions, the annular portions being provided with apertures corresponding to the apertures in the spider, a rim mounted upon the cylindrical portions of the said members and securing the members together, sleeves extending through the corresponding apertures having their ends secured therein, and resilient means surrounding the sleeves within the apertures in the spider.

4. A resilient wheel comprising a spider having a set of apertures, members having cylindrical and annular portions the annular portions being disposed upon opposite sides of the spider and provided with apertures corresponding to the apertures in the spider and the cylinder portions of the said members provided with projections, a rim mounted upon the cylindrical portions of the said members having a recess for the reception of the said projections, sleeves extending through the corresponding apertures having their ends secured in the apertures in the said members, and resilient means surrounding the sleeves within the apertures in the spider.

5. A resilient wheel comprising a spider having a set of apertures, members having cylindrical and annular portions, and apertures in the annular portions corresponding to the apertures in the spider the edges of the said apertures being provided with seats, a rim shrunk upon the cylindrical portions of the said members and securing the same together, sleeves extending through the corresponding apertures and having their ends expanded into the seats in the edges of the apertures in the said members, and resilient means surrounding the sleeves within the apertures in the spider.

In testimony whereof, I have hereunto subscribed my name this 31st day of August, 1908.

GEORGE M. EATON.

Witnesses:
   JOSH C. DOON,
   BIRNEY HINES.